US010819869B1

(12) United States Patent
Hegarty et al.

(10) Patent No.: US 10,819,869 B1
(45) Date of Patent: Oct. 27, 2020

(54) MEDIA CURL MITIGATION SYSTEM

(71) Applicant: ZEBRA TECHNOLOGIES CORPORATION, Lincolnshire, IL (US)

(72) Inventors: Patrick J. Hegarty, Dedham, MA (US); Devan J. Lippman, Cumberland, RI (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/516,571

(22) Filed: Jul. 19, 2019

(51) Int. Cl.
*H04L 13/06* (2006.01)
*H04N 1/00* (2006.01)
*H04N 1/387* (2006.01)

(52) U.S. Cl.
CPC ....... *H04N 1/00647* (2013.01); *H04N 1/0071* (2013.01); *H04N 1/00665* (2013.01); *H04N 1/00737* (2013.01); *H04N 1/00917* (2013.01); *H04N 1/3873* (2013.01)

(58) Field of Classification Search
CPC ..................... H04N 1/00647; H04N 1/00917
USPC ......... 358/1.12, 3.26, 3.32; 271/3.15, 16, 19
See application file for complete search history.

(56) References Cited

U.S. PATENT DOCUMENTS

| 6,848,845 | B2 | 2/2005 | Poole | |
|---|---|---|---|---|
| 9,211,744 | B2 | 12/2015 | Wong et al. | |
| 2002/0154206 | A1 | 10/2002 | Ullenius et al. | |
| 2008/0252000 | A1* | 10/2008 | Dochi | B41J 11/0005 271/264 |
| 2014/0140746 | A1* | 5/2014 | Egawa | B41J 11/0005 399/406 |
| 2017/0095940 | A1 | 4/2017 | Colagiovanni | |

* cited by examiner

*Primary Examiner* — Jamares Q Washington

(57) ABSTRACT

A printer includes: a motor driving a transport member according to an operational parameter, to transport media along a media path from a media supply to a printhead; a first distance sensor disposed on a first side of the media path to measure a first distance between the media and the first distance sensor; and a controller configured to: receive the measured distance; detect curling of the media based on the first measured distance; and responsive to detecting curling of the media, update the operational parameter at the motor.

16 Claims, 5 Drawing Sheets

MEDIA CURL MITIGATION SYSTEM

BACKGROUND

Various printers accept media (e.g. label webs, paper and the like) in rolls. In such a printer, media is dispensed from the roll towards an impression mechanism for printing. The roll may, however, impart curvature to the media, which may result in the media deviating from a media path towards the impression mechanism. Such deviation can negatively affect print quality and/or interrupt printing.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
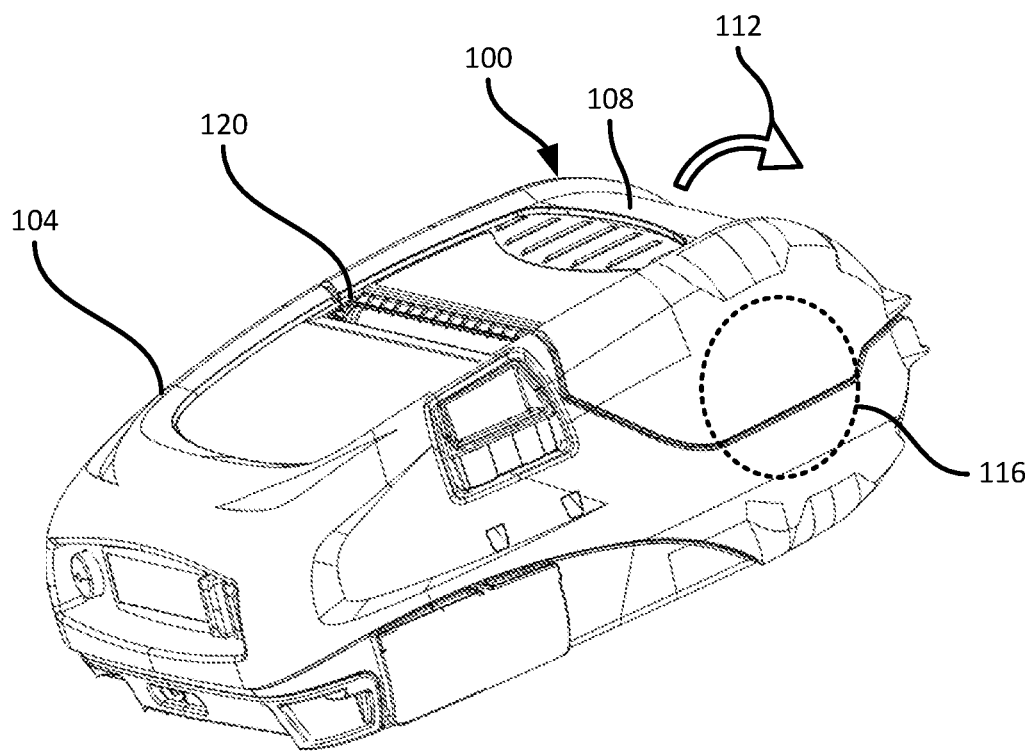
FIG. 1 is an isometric view of a printer.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a printer, comprising: a motor driving a transport member according to an operational parameter, to transport media along a media path from a media supply to a printhead; a first distance sensor disposed on a first side of the media path to measure a first distance between the media and the first distance sensor; and a controller configured to: receive the first distance; detect curling of the media based on the first distance; and responsive to detecting curling of the media, update the operational parameter at the motor.

Additional examples disclosed herein are directed to a method of media curl mitigation in a printer, the method comprising: receiving, at a controller of a printer, a first distance from a first distance sensor disposed on a first side of a media path to measure the first distance between the media and the first distance sensor; at the controller, detecting curling of the media based on the first distance; and responsive to detecting curling of the media, updating an operational parameter of a motor driving a transport member to transport media along a media path from a media supply to a printhead.

FIG. 1 depicts a printer 100, which in the illustrated example is a mobile, handheld printer. The printer 100 may have a wide variety of other form factors in other examples, however, including a desktop form factor or the like.

The printer 100 includes a housing 104 defining a media compartment therein. A portion of the housing 104, such as a door 108 configured to open in the direction 112 by rotating relative to the remainder of the housing 104, permits access to the media compartment. With the door 108 in an open position, a media roll 116 may be placed inside the media compartment. During printing operations, a transport member such as a driven platen roller, as will be discussed below, causes media to be dispensed from the media roll 116 towards a printhead adjacent to an outlet 120 of the printer 100. Printed media is therefore processed at the printhead and subsequently exits the housing 104 at the outlet 120, for removal by an operator of the printer 100.

Figure 2:
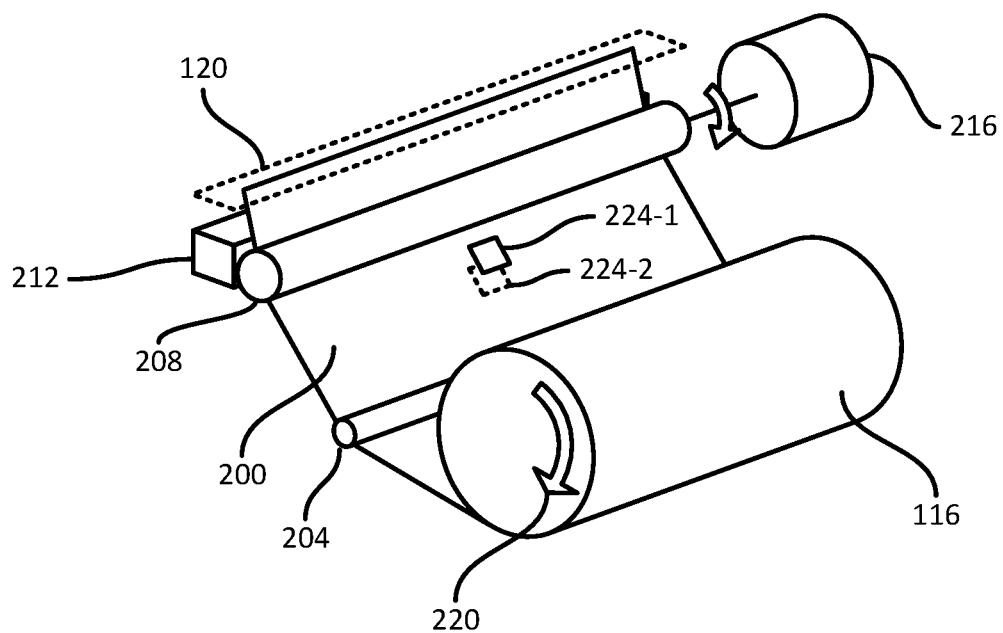
FIG. 2 is a schematic of certain internal components of the printer of FIG. 1.

Turning to FIG. 2, certain internal components of the printer 100 are illustrated. In particular, the media roll 116 is shown within the media compartment. Media 200, such as paper, a web carrying labels, or the like, is dispensed from the roll 116 and travels along a media path extending from the roll 116 to an intermediate roller 204 and to a nip formed by a platen roller 208 and a printhead 212. As will be apparent to those skilled in the art, the printhead 212 applies indicia to the media 200. For example, the printhead 212 may be a thermal printhead, configured to selectively heat regions of the media 200 as the media 200 traverses the nip, to apply pigmentation to the media 200 (e.g. by altering the state of thermally active pigment in the media 200 itself). The media 200 then exits the printer 100 via the outlet 120.

As will be understood by those skilled in the art, the media path followed by the media 200 from the media roll 116 to the nip may vary depending on the configuration of the printer 100. For example, the intermediate roller 204 can be omitted. In other examples, additional intermediate rollers or other guide structures can be included along the media path.

The above-mentioned transport member is implemented, in the present example, by the platen roller 208. The platen roller 208 is driven by a motor 216, and pulls the media 200 towards the nip from the media roll 116, causing the media roll 116 to rotate in the direction 220 to dispense the media 200. The physical placement of the motor 216 within the housing 104 of the printer 100 need not be as shown in FIG. 2. Further, the motor 216 need not be coupled to the platen roller 208 in a direct-drive configuration as shown in FIG. 2. In other embodiments, the motor 216 can be connected to the platen roller 208 by a gear train or other transmissive component.

The printer 100 also includes at least one distance sensor. In the present example, the printer 100 includes a first distance sensor 224-1, and a second distance sensor 224-2. The distance sensors 224 are disposed along the media path on opposite sides of the media 200. Specifically, the first distance sensor 224-1 is disposed on a first side of the media path, also referred to in this embodiment as the back side (as the side of the media 200 facing the first distance sensor 224-1 is the back side, which is not printed). The second distance sensor 224-2 is disposed on a second side of the media path, also referred to in this embodiment as the front side (as the side of the media 200 facing the second distance sensor 224-2 is the front side, which is printed by the printhead 212).

The distance sensors 224 are reflective sensors in the present example, and each include an emitter such as a light-emitting diode (LED) and a light sensor for detecting reflections of light emitted by the LED from the media 200. The intensity of the reflections are employed to determine a distance between each of the distance sensors 224 and the media 200. In other examples, various other types of distance sensors may be employed, including for example ultrasonic sensors.

As will be discussed in greater detail below, each distance sensor 224 measures a distance between the distance sensor 224 itself and the media 200 as the media 200 travels along the media path. The printer 100 processes the distance measurements produced by the distance sensors 224 to detect various conditions, including media curl. The printer 100 also adjusts one or more of an operational parameter of the motor 216 and of the printhead 212 in response to detecting certain conditions, as will be described below in greater detail.

Figure 3A:
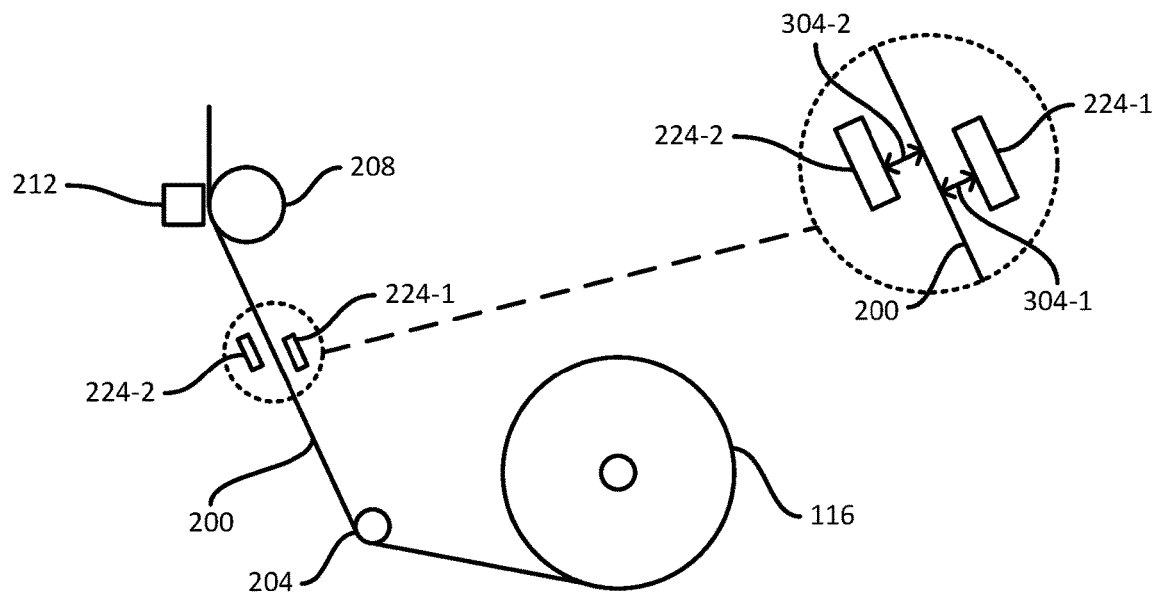
FIG. 3A is a side view of the components of FIG. 2 illustrating an expected media path.
Figure 3B:
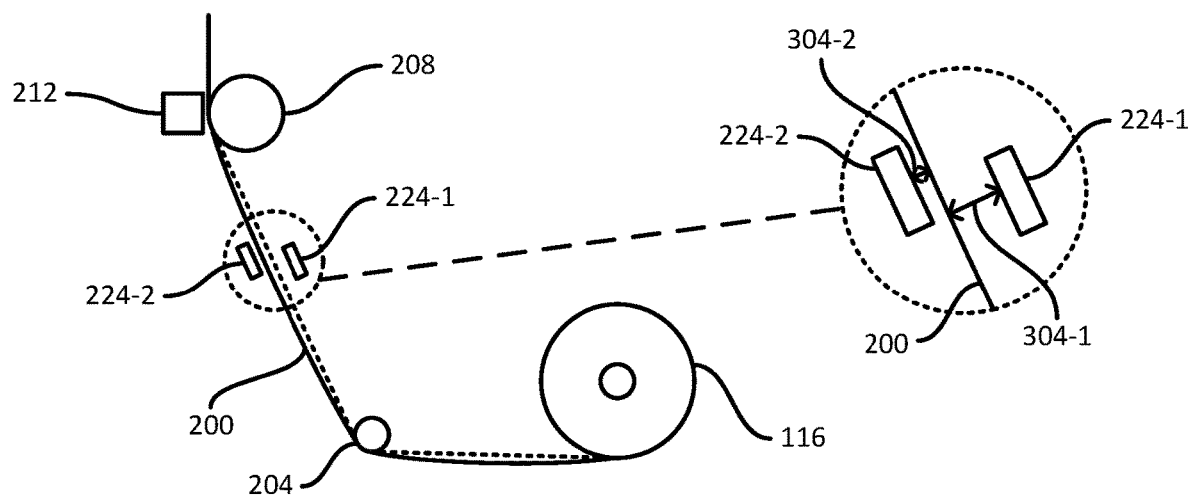
FIG. 3B is a side view of the components of FIG. 2 illustrating media curl.

Turning to FIGS. 3A and 3B, side views of the components of the printer 100 shown in FIG. 2 are illustrated. In particular, FIG. 3A illustrates the media 200 travelling from the media roll 116 to the printhead 212 without curling. That is, the media 200 remains substantially planar between the media roll 116 and the intermediate roller 204, and between the intermediate roller 204 and the platen roller 208 and printhead 212. In other words, the media 200 in FIG. 3A deviates minimally from an ideal media path. As shown in the detail view of FIG. 3A, distances 304-1 and 304-2 between the distance sensors 224-1 and 224-2, respectively, and the media 200 are at nominal values corresponding to the ideal media path. Further, in the illustrated example the distances 304 are substantially equal to one another.

FIG. 3B, in contrast to FIG. 3A, illustrates a deviation of the media 200 (shown in solid lines) from the ideal media path (i.e. the expected, or nominal, media path, shown in dashed lines). The deviation is caused by curl in the media 200 imparted by the media roll 116. For example, as the media roll 116 is consumed, the remaining media 200 is subject to a greater degree of curvature on the media roll 116 itself, and is more prone to remaining curved when dispensed from the media roll 116. As seen in the detail view of FIG. 3B, the distance 304-1 between the media 200 and the first distance sensor 224-1 has increased relative to FIG. 3A, and the distance 304-2 between the media 200 and the second distance sensor 224-2 has decreased relative to FIG. 3A.

Curling of the media 200 as shown in FIG. 3B may cause the media 200 to catch on internal structures within the printer 100 (including, but not limited to, the distance sensors 224 themselves), which may reduce print quality or interrupt printing. Such media curl may also impose greater resistance on the platen roller 208 and therefore the motor 216. Increased resistance can reduce the rate at which the media 200 traverses the printhead 212, which can affect print quality (e.g. causing tone shifts during a print operation). As mentioned above, the printer 100 detects media curl such as that shown in FIG. 3B, and adjusts operational parameters of either or both of the motor 216 and the printhead 212 to mitigate the above effects on print quality.

Figure 4:
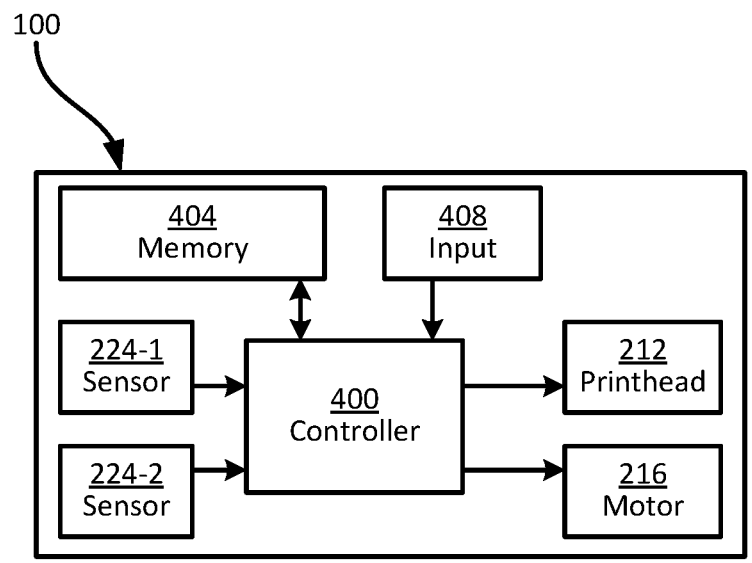
FIG. 4 is a block diagram of certain components of the printer of FIG. 1.

Before discussing the functionality implemented by the printer 100 to detect and compensate for media curl, certain additional components of the printer 100 are illustrated in FIG. 4. In particular, the printer 100 includes a controller 400, such as a central processing unit (CPU), field-programmable gate array (FPGA), or the like. The controller 400 is interconnected with a non-transitory computer readable storage medium, such as a memory 404. The memory 404 includes any suitable combination of volatile memory (e.g. Random Access Memory (RAM)) and non-volatile memory (e.g. read only memory (ROM), Electrically Erasable Programmable Read Only Memory (EEPROM), flash). The controller 400 and the memory 404 each comprise one or more integrated circuits (ICs). The memory 404 stores computer-readable instructions for execution by the controller 400 to implement the media curl detection functionality discussed below.

The printer 100 also includes at least one input device 408 interconnected with the controller 400. The input(s) include any suitable one of, or any suitable combination of, a button, a keypad, and the like. In general, the input(s) 408 are activated by an operator of the printer 100 to initiate a print operation.

The distance sensors 224-1 and 224-2 are also shown in FIG. 4, as are the printhead 212 and the motor 216. The distance sensors 224 provide distance measurements to the controller 400, e.g. at a configurable frequency, and the controller 400 updates operational parameters provided to the printhead 212 and/or the motor 216 based on the distance measurements. The operational parameters provided to the motor 216 can include, for example, torque and/or speed settings. The operational parameters provided to the printhead 212 can include tone adjustment settings, e.g. controlling an intensity of indicia to be applied to the media 200 by the printhead 212.

Figure 5:
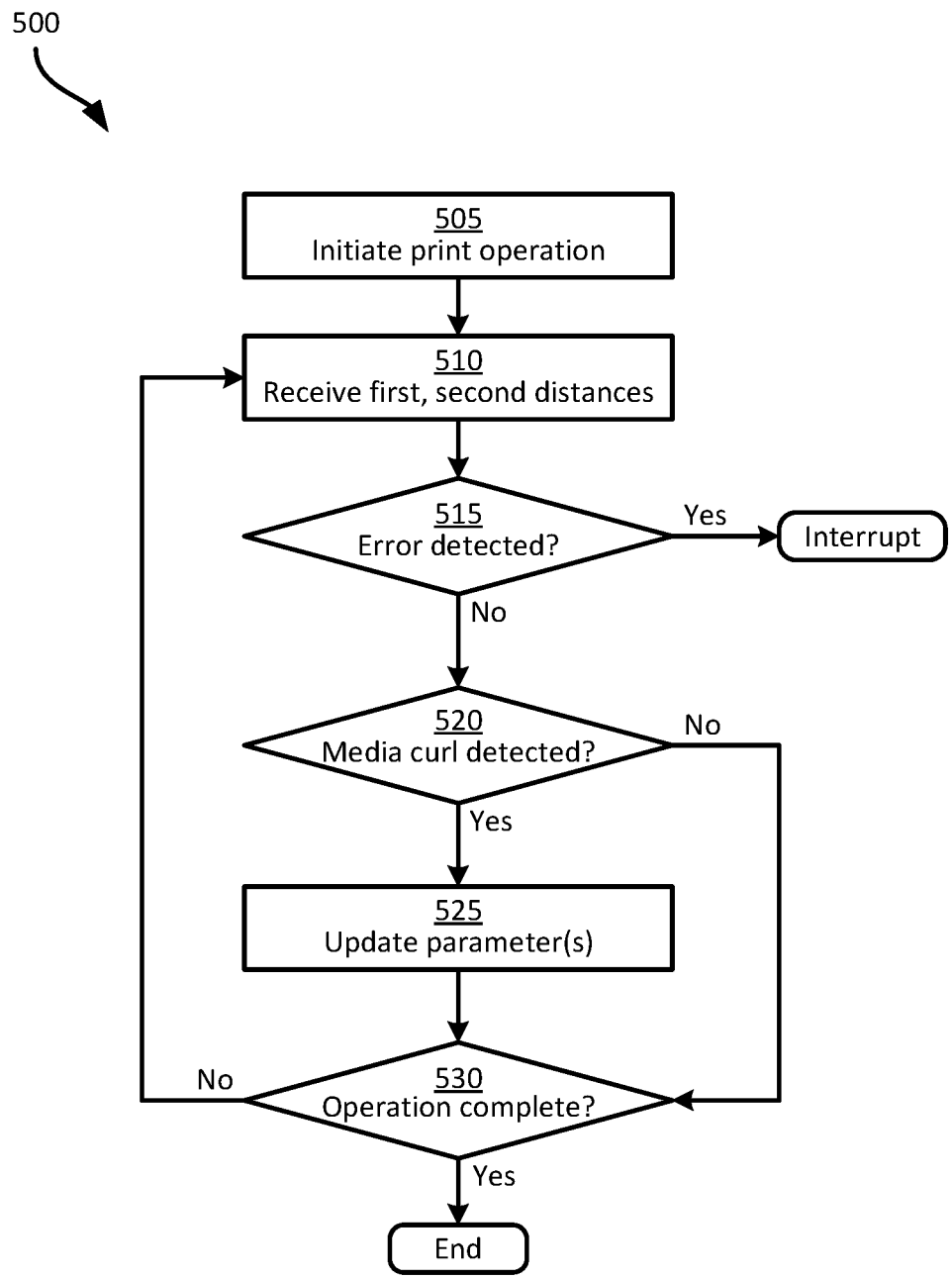
FIG. 5 is a flowchart of a method for media curl mitigation.

Turning to FIG. 5, a method 500 of media curl mitigation is illustrated. Performance of the method 500 will be discussed in connection with its performance by the printer 100. Specifically, the method 500 is performed by the controller 400, via execution of the above-mentioned instructions stored in the memory 404.

At block 505, the controller 400 initiates a print operation, for example in response to receipt of a command from the input 408 and/or data for printing from another computing device, storage device, or the like. Initiation of a print operation includes activation of the motor 216 to draw the media 200 from the media roll 116 towards the nip formed by the printhead 212 and the platen roller 208, and activation of the printhead 212 itself to apply indicia to the media 200. The controller 400 also begins monitoring the distance between the media 200 and the distance sensors 224.

Specifically, at block 510, the controller 400 receives distance measurements from one or both of the distance sensors 224, indicating the distance between the media 200 and the corresponding distance sensor 224. In the present example, the controller 400 receives distance measurements from both distance sensors 224.

At blocks 515 and 520, the controller 400 detects one or more abnormal printing conditions in the printer 100. In particular, the controller 400 detects the presence or absence of media curl at block 520. Various other conditions may also be possible, however, and the controller 400 is therefore also configured to detect whether such other conditions are indicated by the distance measurements from the distance sensors 224 at block 515. In other examples, the performances of blocks 515 and 520 may be reversed, or blocks 515 and 520 may be performed substantially simultaneously.

The assessments at blocks 515 and 520 include comparing the distance measurements obtained from the distance sensors 224 to one or more thresholds. For example, the memory 404 can store expected distances between the media 200 and each of the distance sensors 224, as well as thresholds associated with the expected distances. The controller 400 can therefore, in performing the assessments at blocks 515 and 520, determine a difference between each distance measurement and the corresponding expected distance, and compare the difference to the corresponding threshold. In further examples, in which the distance sensors 224 are disposed at equal distances on opposing sides of the media path, the controller 400 can determine a difference between the first and second measured distances, and compare the difference to a threshold. A difference of about zero, for example, may indicate that there is no media curl.

In other examples, the memory 404 can store upper and lower thresholds for each distance sensor 224, representing acceptable bounds for the distance measurement from that distance sensor 224. The distance measurement from each distance sensor 224 can therefore be compared directly to each of the upper and lower thresholds.

As will now be apparent to those skilled in the art, and as illustrated in FIGS. 3A and 3B, media curl results in the media 200 being closer than expected to one of the distance sensors 224 (e.g. the distance sensor 224-2 in FIG. 3B), and further than expected from the other of the distance sensors 224 (e.g. the distance sensor 224-1 in FIG. 3B). The controller 400 therefore determines, at block 520, whether the distance measurements from the distance sensors 224 indicate deviation of the media 200 from the expected distances in opposite directions. In other words, the determination at block 520 is affirmative when the media 200 is closer than expected to the first distance sensor 224-1 and further than expected from the second distance sensor 224-2, or vice versa.

In some scenarios, the distance measurements from the distance sensors 224 may deviate from expected measurements, but not in opposite directions. For example, both distance sensors 224 may report distance measurements indicating that the media 200 is closer than expected to the distance sensors 224. Such distance measurements are not indicative of media curl, and the determination at block 520 is therefore negative. However, given that the thickness of the media 200 is substantially constant, such distance measurements nevertheless indicate an error condition (e.g. a media jam resulting in crumpling of the media 200, a sensor malfunction, or the like). The determination at block 515 in therefore affirmative in such a scenario.

In other words, the controller 400 determines whether media curl is detected at block 520, and whether any other error conditions are detected at block 515. When the determination at block 515 is affirmative, the controller 400 interrupts the print operation, and may generate an alert (e.g. via an indicator light, speaker or the like) for the operator of the printer 100.

When the determination at block 520 is negative, the controller 400 proceeds to block 530, without altering the operational parameters of the printhead 212 and the motor 216. At block 530, the controller 400 determines whether the print operation is complete. When the determination at block 530 is negative, the controller 400 returns to block 510 to obtain further distance measurements from the distance sensors 224. The frequency with which block 510 is performed is not particularly limited. For example, the controller 400 can obtain distance measurements at block 510 sufficiently frequently to obtain measurements at a predefined spatial resolution on the media 200 (e.g. for every 0.5 mm of media that traverses the distance sensors 224). In other examples, the distance sensors 224 are configured to provide distance measurements to the controller 400 at a fixed frequency (e.g. 30 Hz).

When the determination at block 520 is affirmative, before proceeding to block 530 the controller 400 performs block 525, at which one or more operational parameters of the motor 216 and/or the printhead 212 are updated. For example, the controller 400 can increase the torque and/or the speed applied by the motor 216 to the platen roller 208 in response to detecting media curl. The increase in torque and/or speed can be proportional to the degree of media curl detected (e.g. to the magnitude of deviation from the expected media path). As will be understood by those skilled in the art, increasing the speed of the motor 216, or increasing the torque applied by the motor 216, serves to counteract media curl, returning the media 200 to the expected media path.

Operational parameters of the printhead 212 that may be adjusted at block 525 include an intensity parameter, which may be decreased to avoid a shift to darker tones as the media travels more slowly through the nip as a result of media curl.

Variations to the above functionality are contemplated. For example, in some examples, one or the other of the distance sensors 224 can be omitted. In such examples, the performance of block 515 is omitted from the method 500, and the determination at block 520 is performed by assessing whether the single distance measurement received from the single distance sensor 224 deviates from an expected distance by more than a threshold.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A printer, comprising:
   a motor to drive a transport member according to an operational parameter, to transport media along a media path from a media supply to a printhead;
   a first distance sensor disposed on a first side of the media path to measure a first distance between the media and the first distance sensor;
   a second distance sensor disposed on a second side of the media path to measure a second distance between the media and the second distance sensor;
   a controller configured to:
      receive the first distance and second distance;
      detect curling of the media based on the first distance and the second distance; and
      responsive to detecting curling of the media, update the operational parameter at the motor.

2. The printer of claim 1, wherein the transport member includes a platen roller adjacent to the printhead and driven by the motor.

3. The printer of claim 1, wherein the controller is further configured, in order to update the operational parameter, to change a torque applied by the motor.

4. The printer of claim 1, wherein the controller is further configured, in order to update the operational parameter, to change a speed of the motor.

5. The printer of claim 1, wherein the controller is further configured, in order to detect curling of the media, to compare the first distance with a first threshold.

6. The printer of claim 1, wherein the controller is further configured, in order to detect curling of the media, to determine a difference between the first distance and an expected distance.

7. The printer of claim 1, wherein the controller is further configured, in order to detect curling of the media, to compare the first distance and the second distance to respective thresholds.

8. The printer of claim 1, wherein the controller is further configured, in order to detect curling of the media, to determine a difference between the first distance and the second distance.

9. A method of media curl mitigation in a printer, the method comprising:
   receiving, at a controller of a printer:
      a first distance from a first distance sensor disposed on a first side of a media path to measure the first distance between the media and the first distance sensor; and
      a second distance from a second distance sensor disposed on a second side of the media path to measure a second distance between the media and the second distance sensor;
   detecting, at the controller, curling of the media based on the first distance and the second distance; and
   responsive to detecting curling of the media, updating an operational parameter of a motor driving a transport member to transport media along a media path from a media supply to a printhead.

10. The method of claim 9, wherein the transport member includes a platen roller adjacent to the printhead and driven by the motor.

11. The method of claim 9, wherein updating the operational parameter comprises changing a torque applied by the motor.

12. The method of claim 9, wherein updating the operational parameter comprises changing a speed of the motor.

13. The method of claim 9, wherein detecting curling of the media comprises comparing the first distance with a first threshold.

14. The method of claim 9, wherein detecting curling of the media comprises determining a difference between the first distance and an expected distance.

15. The method of claim 9, wherein detecting curling of the media comprises comparing the first distance and the second distance to respective thresholds.

16. The method of claim 9, wherein detecting curling of the media comprises determining a difference between the first distance and the second distance.

* * * * *